United States Patent [19]

Hughes et al.

[11] 4,354,004
[45] Oct. 12, 1982

[54] FILM COMPOSITIONS FROM OLEFIN POLYMER BLENDS

[75] Inventors: Patrick M. Hughes; Ananda M. Chatterjee, both of Houston; Charles C. Hwo, Sugarland, all of Tex.

[73] Assignee: Shell Oil Company, Houston, Tex.

[21] Appl. No.: 305,863

[22] Filed: Sep. 28, 1981

[51] Int. Cl.³ .................... C08L 23/20; C08L 23/12; C08L 23/06
[52] U.S. Cl. .................................................. 525/240
[58] Field of Search ........................................ 525/240

[56] References Cited

U.S. PATENT DOCUMENTS

| | | | |
|---|---|---|---|
| 3,440,208 | 4/1969 | Foglia et al. | 260/41 |
| 3,634,551 | 1/1972 | Stancell et al. | 260/897 A |
| 3,634,552 | 1/1972 | Foglia et al. | 260/897 A |
| 3,634,553 | 1/1972 | Foglia et al. | 260/897 A |
| 3,684,760 | 8/1972 | Goldbach et al. | 260/31.2 R |
| 3,808,304 | 4/1974 | Schirmer | 264/289 |
| 3,836,607 | 9/1974 | Finkmann et al. | 260/897 A |
| 4,075,290 | 2/1978 | Denzel et al. | 260/897 A |
| 4,136,501 | 1/1979 | Connolly | 53/461 |
| 4,169,910 | 10/1979 | Graboski | 428/35 |
| 4,316,970 | 2/1982 | Hughes | 525/240 |

FOREIGN PATENT DOCUMENTS 695803 9/1967 Belgium .

OTHER PUBLICATIONS

Witco Chemical Polymer Division Polybutylene brochure, 4 pp., (1977?).
Abstract of Netherlands G707690, 12/04/67.

*Primary Examiner*—Carman J. Seccuro

[57] ABSTRACT

A heat sealable blend of a butene-1-ethylene copolymer, about 2 to 9% by weight of polypropylene and from about 0.02 to 1.5% by weight of high density polyethylene can be processed at high line speed in the blown-bubble extrusion process to form films or sheets exhibiting improved heat sealing characteristics, processability, tear strength and other properties.

6 Claims, No Drawings

FILM COMPOSITIONS FROM OLEFIN POLYMER BLENDS

FIELD OF THE INVENTION

This invention relates to improvements in compositions for the production of film from blends of butene-1-ethylene copolymer and polypropylene. More particularly, the invention is directed to increasing the processing speed in the production of blown biaxially oriented film from blends of butene-1-ethylene copolymer and about 2 to 9% by weight of polypropylene by the addition of very small amounts of high density polyethylene.

CROSS REFERENCE TO RELATED APPLICATION

This application is directed to an improvement of the invention of co-pending Ser. No. 174,482, filed Aug. 1, 1980, now U.S. Pat. No. 4,316,970.

BACKGROUND OF THE INVENTION

Films of thermoplastic polymer compositions have found many commercial uses, primarily in packaging. One large field of use of such films is in the production of plastic bags, such as trash and leaf bags, and in shipping sacks.

A plastic film suitable for use in the fabrication of bags, shipping sacks and other items must possess a variety of good physical and mechanical properties. The film should be strongly resistant to tearing and exhibit good tensile strength. Clarity or transparency is another desired property. It is advantageous if heat sealing of layers of the film may be conducted over a broad range of sealing temperatures while obtaining good seal strength. To be favorable economically, the film should be readily processable at high production speeds (line speeds) and an increase in film gauge should not be required to maintain satisfactory physical and mechanical properties.

Films for use in packaging and sacking are conventionally produced by the well known blown-bubble extrusion process. The process is briefly described, for example, in "Encyclopedia of Chemical Technology," Kirk-Othmer, 2nd Ed., 1966, Vol. 9, pp. 235–236. In that process, a tube of thermoplastic polymer melt is extruded through an annular die, inflated by air to a size dictated by the film properties desired and limited by polymer melt properties, cooled with externally blown air (typically about 40° to 60° F.), collapsed to a flat tube, and wound on rolls. The ratio of bubble diameter to die diameter known as the blowup ratio, determines the extent to which the resulting film is biaxially oriented, which, together with the tensile properties of the polymer and the thickness (gauge) of the film determines the strength of the resulting film. The production of blown film from commercial film grade polybutylene resins is described in Technical Bulletin SC:397-79 of Shell Chemical Company, entitled "Processing Shell Polybutylene Film Grade Resins," published May, 1979. Conventional nomenclature frequently refers to films of greater than 10 mil thickness as sheet, although the process for producing them is called blown film extrusion, even for production of such sheets of up to 40 mil thickness.

In current commercial practice, low density polyethylene (LDPE) in the form of biaxially oriented films is the most widely used material for the production of plastic bags and shipping sacks. However, LDPE film has relatively low tear strength. Isotactic poly-1-butene and its copolymers with small amounts of other monomers, commonly referred to as polybutylene homopolymers and copolymers, are superior to LDPE in respect to tear strength. This makes it possible to produce articles of a given strength from films of significantly lower gauge when using polybutylene rather than LDPE.

Blends of copolymers of butene-1 with small amounts of ethylene, hereafter referred to as "butene-1-ethylene copolymers" or "PBE," are products of commerce which have been employed for production of film by the blown-bubble extrusion process. In order to be able to take advantage of the inherently greater strength of polybutylene or PBE films compared to LPDE, it is necessary to modify some of the properties of polybutylene. For example, heat seals between layers of unmodified and uncompounded butene-1 polymers have an unsatisfactory seal strength. Incorporating 1 to 5 percent of LDPE into polybutylene, as disclosed in U.S. Pat. No. 3,634,551, improves heat seal strength somewhat. However, blends of butene-1 polymers and LDPE form films which can only be heat sealed over a relatively narrow range of temperatures.

It has recently been discovered by one of us that a blend of butene-1-ethylene copolymer and about 2 to 9% by weight of polypropylene (PP) may be used for the production of film which has an excellent overall balance of properties, including satisfactory heat sealing properties. This is disclosed and claimed in co-pending U.S. application Ser. No. 174,482, filed Aug. 1, 1980.

One of the significant properties of polymers if they are to be commercially useful for conversion to film by the blown bubble extrusion process is the ability to be processed at high line speeds. Line speed in the blown bubble extrusion process is established by balancing a number of factors, including the following: equipment parameters, such as design of the extruder, including extruder screw and air cooling ring, die diameter, die gap, die land length, etc.; polymer properties, such as the throughput rate at which extruded polymer acquires sufficient melt strength to hold the air pressure of the bubble; and process variables, such as extruder temperature and speed, temperature and rate of chilled air, air pressure in the bubble, etc.

One of the disadvantages of the film-forming compositions of butene-1 polymers with LDPE is that they exhibit a relatively lower processing speed in the blown-bubble extrusion process, compared to LDPE.

The compositions of Ser. No. 174,482 exhibit a significant improvement in maximum permissible line speed, compared with blends of LDPE with the same butene-1 polymer and compared with commercially available prior polybutylene compositions for film. However, a still further improvement in line speed was desired.

SUMMARY OF THE INVENTION

We have now found that addition of a very small amount of high density polyethylene (HDPE) to the compositions of Ser. No. 174,482 permits the compositions to be converted to film in the blown-bubble extrusion process at a rate which exceeds that of the prior compositions and generally comes closer to the line speed of LDPE for production of film of the same general strength properties.

Compared to the properties of compositions of Ser. No. 174,482, the compositions of this invention differ in permitting operation at greater line speeds and in providing films having better tear strength and clarity.

Compared to films prepared from the PBE/LDPE compositions of the art prior to said application, films according to this invention exhibit improvements in heat seal strength, tensile strength, clarity and other properties. The films may be heat sealed over a broad temperature range at temperatures generally lower than film formed from blends of butene-1-ethylene copolymers and LDPE.

The compositions according to this invention consist essentially of a blend of about 90 to 98% by weight of an isotactic butene-1-ethylene copolymer, about 2 to 9% by weight of isotactic polypropylene, and about 0.05 to 1.5% by weight of high density polyethylene. The invention is also directed to the production of films from these compositions by the blown bubble extrusion method and to the resulting films.

PRIOR ART

U.S. Pat. No. 3,634,551 to Stancell et al discloses that incorporating 1-5 weight percent low density polyethylene into butene-1 homopolymer significantly increases the heat seal strength of resulting films. Addition of polypropylene is referred to only by mention, as prior art, of the Canadian equivalent of the parent application of U.S. Pat. No. 3,808,304.

U.S. Pat. No. 3,808,304 to Schirmer discloses heat sealable blends of butene-1 homopolymer with polypropylene. Maximum seal strengths are obtained at polypropylene levels remaining from about 20-80% by weight. This high level of polypropylene addition may be expected to adversely affect other film properties, such as tear strengths. Addition of polyethylene is not disclosed.

U.S. Pat. No. 4,075,290 to Denzel et al discloses heat sealable blends of 80-99% by weight of polybutylene and 1-20% by weight of polypropylene. The disclosure specifies limited ranges of physical properties for both the polybutylene and polypropylene components. Addition of low density polyethylene to polybutylene is disclosed as prior art by reference to U.S. Pat. No. 3,634,551 (supra) and its German equivalent.

In U.S. Pat. No. 3,733,373 to McConnell et al, the invention is directed to improving the usefulness of butene-1 homo- or copolymers as molding resins. In molding these resins the polymer crystallizes out of the melt as a soft, clear plastic (Form II) and then gradually changes to the more thermodynamically stable Form I. The patentees state that during this transformation the molded objects are tacky and warp and become cloudy, and that the molded object tends to be so soft that the knock-out pins of the mold tend to puncture the molded parts. The patentees disclose that addition of high or medium density polyethylene substantially increases the crystallization temperature of the poly-1-butene and permits the blends to mold extremely well and to be released from the mold without being punctured or dented by the knock-out pins. The concentration range of 0.1-30% by weight of ethylene polymer is disclosed as useful. The increase in crystallization point, measured by Differential Scanning Calorimetry (DSC) is used in the examples as a measure of effectiveness of the additive. The examples illustrate concentrations of 0.5-30% as being effective in increasing the crystallization point. Addition of polypropylene to the blends of the patent is not disclosed.

DETAILED DESCRIPTION

The copolymer used in the composition is suitably an isotactic thermoplastic butene-1-ethylene copolymer with a melt index of from about 0.1 to 4, preferably about 0.8 to 2.0 and more preferably about 0.9 to 1.1, as measured by ASTM D1238, Condition E. Melt indices and molecular weights of the butene-1-ethylene copolymers are inversely related; the corresponding molecular weight for a copolymer with a given melt index may be readily determined by routine experimentation. A particularly suitable copolymer, for example, has a melt index of about 1.0 and a weight average molecular weight (determined by gel permeation chromatography) of about 570,000. Suitable butene-1-ethylene copolymers contain from about 0.5 to 10 mole percent, preferably about 0.5 to 5 mole percent and more preferably about 1 to 2 mole percent of ethylene. Ethylene contents and densities of the butene-1-ethylene copolymers are also related; the corresponding density for a copolymer with a given ethylene content may also be determined by routine experimentation. A particularly suitable copolymer, for example, has an ethylene content of 1.5 mole percent and a density of 0.908 grams/cm$^3$. The term "isotactic" butene-1-ethylene copolymer, as used herein, refers to a copolymer containing at least 90%, preferably at least 95% and more preferably at least 98% by weight, of isotactic portions, determined as the diethyl ether insoluble component. Methods for preparing the copolymers are well known in the art. The preferred copolymers are commercially available. "PBE" refers to isotactic butene-1-ethylene copolymers of this type.

The polypropylene used in the blends of this invention is so-called isotactic propylene homopolymer. A polypropylene with a melt flow of from about 1 to 10, as measured by ASTM D1238, Condition L, is typically employed. Melt flow and molecular weight of polypropylenes are inversely related; the corresponding molecular weight for a polymer with a given melt flow may be readily determined by routine experimentation. A particularly suitable polypropylene, for example, has a melt flow of about 5, a weight average molecular weight (determined by gel permeation chromatography) of about 360,000 and a density of 0.902 grams/cm$^3$. A wide variety of suitable polypropylenes are commercially available and methods for their preparation are well known in the art. A polypropylene with a viscosity at mixing temperatures approximating that of the butene-1-ethylene copolymer is preferred, in order to facilitate intimate mixing in conventional extrusion compounding equipment. This may be accomplished, for example, by blending butene-1-ethylene copolymer having a melt index of 1.0 (2.4 melt flow) with 5 melt flow polypropylene. "PP" refers to polypropylenes of the type described.

The high density polyethylene employed in the composition of this invention is characterized by a density above about 0.93 g/cc and preferably at least about 0.95 g/cc. An HDPE with a melt index of from about 0.1 to 20, as measured by ASTM D1238, Condition E, is typically employed; HDPE of higher melt index may also be suitable. The melt index and molecular weight of HDPE are inversely related; the corresponding molecular weight for a polymer with a given melt index may be readily determined by routine experimentation. A particularly suitable HDPE, for example has a melt index of 0.45 g/10 min., a weight average molecular weight of about 166,000 and a density of 0.950 grams/cm³. A high density polyethylene with a viscosity at mixing temperatures approximating that of the butene-1-ethylene copolymer facilitates intimate mixing in conventional extrusion compounding equipment. A wide variety of suitable high density polyethylenes are commercially available and methods for their preparation are well known in the art. They may be prepared by polymerization processes employing Ziegler type coordination catalysts or supported chromium oxide catalysts. Commercially available HDPE of either type is suitable. "HDPE" refers to high density polyethylene of the type described.

The amount of polypropylene blended with the butene-1-ethylene copolymer is critical. The compositions of the invention contain from about 2 to 9% by weight, preferably about 4 to 8% by weight, still more preferably about 6 to 8%, and most preferably about 6% by weight, of polypropylene. Polypropylene addition at certain levels within the range described may optimize certain properties but not others; the most preferred level of about 6% polypropylene represents the level at which the compositions exhibit the best overall improved property balance.

The benefit of HDPE incorporation is apparently due to a crystal nucleating effect. Only very small amounts of HDPE are required to provide the desired beneficial effects. If properly blended, as further described below, the proportion of HDPE in a polymer matrix of PBE and small amounts of polypropylene in the above-described range which provides the beneficial effects of this invention is in the range from 0.02 to 0.5% by weight; substantially the full beneficial effects can in some cases be obtained at concentrations below 0.1%; thus, amounts in the range of 0.02 to <0.1 are often adequate; amounts in the range from 0.05 to 0.4, and more particularly from 0.05 to 0.25 will generally be sufficient. However, somewhat larger amounts, up to 1.5 to 2% may be required to obtain the full effect if the blending method is not highly effective.

The method of combining PBE, PP and HDPE significantly affects the properties of the composition. For commercial utility, it is desired to use the least amount of energy to combine the components into an effective blend, i.e., a blend in which the HDPE is dispersed in the PBE, and not in the PP. It has been found that it is highly desirable to first incorporate the HDPE in PBE, either by incorporating HDPE in a masterbatch to be added to the major portion of PBE prior to or together with the PP, or by incorporating HDPE in the PBE before PP is added. For commercial practice, a masterbatch of HDPE in PBE may be prepared in an intensive mixing device such as a twin-screw extruder and incorporated in PBE by passing PBE through an extruder coupled with a side-arm extruder through which the masterbatch is added. An alternative method is to employ an extruder provided with two side-arm extruders; HDPE is injected through the first and PP through the second side-arm extruder. Other intensive mixing devices, such as Banbury mixers, may be employed to make the masterbatch. The principle to be observed is to avoid incorporation of HDPE in the PP, as would occur if a masterbatch of HDPE in PP were employed and as would occur at least in part if HDPE and PP were added simultaneously through a single side-arm extruder. For convenience of reference, blends prepared in this manner will be designated "intimate blends".

It may also be possible to prepare satisfactory films from compositions prepared by dry blending the components, employing relatively large proportions of HDPE within the overall range to make up for deficiency in its utilization.

If desired, various conventional fillers, thermal and ultraviolet stabilizers, processing agents, slip agents, antiblock agents, nucleating agents, pigments and/or other additives may be incorporated in the polymers before, during or after the blending operation. The effect of various additives on certain properties of the composition may or may not make their presence desirable, depending in part on the contemplated end use. For example, the presence of certain slip agents, while desirable in compositions used for such products as compression wrap, may adversely affect the seal strength of the composition and may therefore be undesirable for use in certain other products, e.g., heavy duty bags, where seal strength is a primary consideration.

After blending, the compositions of the invention can be formed on conventional manufacturing equipment, e.g., blown film equipment. The compositions can be formed into a variety of shapes with cross-sectional thicknesses (gauge) of, for example, about 0.5 to 30 mils. Typical shapes include oriented or unoriented flat or tubular films or sheets, which can be used for wrappings, bags, packages, lay flat irrigation tubing, inflatable dunnage bags and other items. The compositions can be used as replacements for conventional LDPE or PBE/LDPE films or sheets in many applications. The superior overall property balance of the present compositions often makes possible a reduction in gauge of up to one-third or more over the corresponding LDPE products; gauge reduction serves to reduce processing times and the amount of material required per product, and is therefore economically desirable. However, even without such a reduction in gauge, the present compositions can be manufactured (processed) into film and the like at ratios exceeding those for PBE/LDPE blends and, when cold air is blown on the bubble, at rates approaching those for LDPE itself. If the compositions are manufactured into film on conventional blown film machines, a blow up ratio (bubble diameter:die diameter) of from about 1.0 to 4.0, more preferably about 2.0 to 3.0, is typically employed. At present, a ratio of about 2.6 is preferred.

Persons skilled in the art of blown film production will realize that the results obtained with the blends of the invention, with conventional LDPE and with PBE/PP and PBE/LDPE blends are dependent on actual conditions of operation, equipment used and other factors, and can therefore vary considerably when the compositions are used in different equipment or at different conditions.

The preferred method of converting compositions of this invention is the manufacture of film or sheet by the blown film method. The compositions can be processed on equipment designed for manufacture of LDPE film, substantially in the same manner as prior commercial polybutylene film compositions, except that higher processing speeds are possible. A description of the blown film process is given in the Kirk-Othmer reference and in Technical Bulletin SC:391-79 of Shell Chemical Company, cited above.

Several methods may be employed for determining the maximum possible processing rate. The following method was employed in the illustrative examples:

The critical parameter was the "bubble breathing limit". This is the maximum permissible variation in bubble diameter. It is measured by measuring the variation in width of the collapsed film. In the examples, the maximum variation was ±¼ inch, which is the standard tolerance for film up to 2 feet wide. Equipment parameters of extruders and die are fixed for the production of a film of predetermined thickness. Blowup ratio is set for best properties. Extrusion temperature is set to the optimum for desired performance properties, such as tear strength and tensile strength. Chill air temperature is fixed, but air rate may be varied as needed. The maximum permissible processing rate is then determined by increasing extruder output rate until the bubble breathing limit is exceeded.

After manufacture (processing) into film and the like, compositions according to this invention can be fabricated into final products on conventional fabrication equipment, which can be of the in-line or out-of-line variety. With typical in-line equipment, which is more economical to use and used by a majority of the industry, a film is passed directly after its manufacture to the fabrication equipment, e.g., heat sealing machine, used for fabricating into a final product. With typical out-of-line equipment, a film is first stored and not passed directly to the fabrication stage; in the case of butene-1 polymers of this invention, the blown film is typically aged two to three days to allow for the crystalline transformation of the polymer from Form II to the more stable Form I. Heat sealing may be accomplished by conventional means, for example hot wire, bar and dielectric machines. While heat sealing conditions will depend on various factors such as gauge (thickness) and the machine used, heat sealing temperature is generally about 225° to 425° F. All else being equal, the film from composition of this invention may be sealed at lower temperatures and over a broader temperature range than conventional PBE/LDPE film, while affording products with excellent seal strength. This allows fabrication of the present compositions on existing industrial equipment adapted for use with LDPE films; a broad sealing temperature range eliminates the need for precise control, otherwise undesirable and difficult to achieve in an industrial setting, of the sealing temperatures employed.

The compositions according to the invention also exhibit excellent tear strength. Tear strength is related in part to the rate (line speed) at which the material is processed; material processed at higher rates typically exhibit decreased tear strengths. The present compositions, even when processed at rates exceeding those for conventional PBE/LDPE and approaching those for conventional LDPE, exhibit tear strengths substantially above those for the conventional materials. The tear strength of polypropylene itself is much below that of a typical butene-1 polymer; nevertheless, the present compositions consisting primarily of a butene-1 polymer and polypropylene exhibit superior tear strengths. The tensile stress at break of the film itself is also higher for the present compositions than for conventional PBE/LDPE. In addition, the clarity of compositions according to this invention is improved over the clarity of conventional PBE/LDPE and approaches the clarity of LDPE.

The invention is illustrated further in the following examples, which are not to be construed as limiting its scope. In the examples, the materials tested are denoted as follows:

PBE/PP—blend of butene-1-ethylene copolymer (1.5 mole % ethylene, 1.0 melt index, 98% isotactic, 0.908 g/cm$^3$); 6%w propylene homopolymer (5 melt flow, 0.902 g/cm$^3$, wt. av. molecular weight of 360,000); and minor amounts of fatty acid amide slip agent, silica antiblock agent and hindered phenolic thermal-oxidative stabilizer;

PBE/PP/HDPE—the above blend PBE/PP with various amounts of high density polyethylene (commercial product, 0.45 melt index, 0.950 g/cm$^3$);

PBE/LDPE—blend of butene-1-ethylene copolymer (as above); 8%w low density polyethylene (2.1 melt index, 0.924 g/cm$^3$); and minor amounts of slip agent, antiblock agent and stabilizer (as above);

LDPE—low density polyethylene (as above) and minor amounts of antiblock agent and thermal-oxidative stabilizer.

The melt index and melt flow of PBE and PP were measured by ASTM D1238, Conditions E and L, respectively. LDPE and HDPE were commercial products whose properties, given above, are those reported by the manufacturer. The seal strength (tensile stress of seal at break) was measured by sealing two strips of film to each other and subjecting to tension perpendicular to the seal (ASTM D882) until a break occured. The tear strength (Elmendorf tear) was measured by ASTM D1922. The impact strength of the seal (dart drop) was measured by ASTM D1709, Method A (50% failure). The tensile stress at break of the film was measured by ASTM D882. The blends were manufactured into film using cold air blown on the bubble exiting from the blown film die.

EXAMPLE 1

The series of experiments recorded in Table I demonstrates the effectiveness of HDPE as crystal nucleant in PBE/PP compositions and also shows the effect of different methods of combining the components, demonstrating the importance of blending HDPE with PBE prior to combining with PP.

A variety of blends were prepared on a Brabender mixing head with different methods of adding HDPE to the PBE/PP blends. At each blending stage, the mixing took place for 10 minutes at 30 rpm and 190° C.

Crystallization half time ($t_{1/2}$) was measured with a differential scanning calorimeter by heating the sample at 320° C./min to 185° C., holding at that temperature for 4 minutes, and cooling at 10° C./min. The half time was obtained at another preset temperature (80° C. or 85° C.). The crystallization temperature (Tc) was obtained by heating the sample at 20° C./min to 185° C., holding at the temperature for 4 minutes and cooling thereafter at 10° C./min.

Table I lists $t_{1/2}$ and Tc of the HDPE-containing PBE/PP blends. HDPE at 0.2% and 1.0% was added by different methods. A composition of PBE+6% PP without HDPE is included as control.

By comparing $t_{1/2}$ and Tc of blending method in experiment No. 2 with No. 3 in Table I, it is seen that the dispersion of 0.2% HDPE into PBE rather than into PP results in faster crystallization rates. The difference is diminished when a higher amount of HDPE (1.0%) is used, as shown by comparing experiment No. 6 with No. 7. The slow crystallization rate for No. 4 (one step blending) may be due to the reason that the HDPE-containing mixture was only blended one time, whereas in No. 2 and No. 3 it was blended twice, or it may be due to inclusion of HDPE in PP rather than PB in the resulting product.

The data show that the improvement in crystallization rate brought by HDPE is very significant and the method of adding HDPE to the blends has a substantial effect on the processing rate.

HDPE (from 0.22 to 0.33%), approaches that of LDPE, especially when compared for film thicknesses which have corresponding strength properties, i.e., 1.75 mil PBE/PP/HDPE vs. 2.5 mil LDPE; in the latter case, film production in ft$^2$/hr was comparable.

TABLE IIA

Processing Rate of PBE/PP, PBE/PP/HDPE, and LDPE

| Gauge, mil | PBE/PP | PBE/PP + 0.11% HDPE | PBE/PP + 0.22 or 0.33% HDPE | LDPE | |
|---|---|---|---|---|---|
| | 1.75 | 1.75 | 1.75 | 1.75 | 2.5 |
| Max. Line Speed, fpm | 26 | 34 | 37 | 54 | 43 |
| (% of LDPE @ 1.75 mil) | (48%) | (63%) | (69%) | (100%) | (80%) |
| (% of LDPE @ 2.5 mil) | (60%) | (79%) | (86%) | (126%) | (100%) |
| (% of PBE/PP @ 1.75 mil) | (100%) | (131%) | (142%) | (208%) | (165%) |
| Lay Flat, in. | 17 | 17 | 17 | 13½ | 13½ |
| (Blow-up Ratio) | (2.7) | (2.7) | (2.7) | (2.1) | (2.1) |
| ft$^2$/hr. | 2210 | 2890 | 3145 | 3645 | 2903 |
| (% of LDPE @ 1.75 mil) | (63%) | (79%) | (86%) | (100%) | (80%) |
| (% of LDPE @ 2.5 mil) | (76%) | (99%) | (108%) | (1.25%) | (100%) |
| (% of PBE/PP @ 1.75 mil) | (100%) | (131%) | (142%) | (165%) | (131%) |

TABLE I

DSC Crystallization Half-Time & Temperature of Blends

| | Blending Method | t½ @ 80° C. Sec. | t½ @ 85° C. Sec. | Tc, °C. |
|---|---|---|---|---|
| 1. PBE + 6% PP (Control) | | 738 | 2,628 | 60.2 |
| 2. (PBE + 0.2% HDPE) first blended then 6% PP blended | PP added to PBE/HDPE blend | 132 | 298 | 65.8<br>78 (Small) |
| 3. (PP + 3.2% HDPE):PBE = 1:15.2 Final blend = PBE + 6% PP + 0.2% HDPE | PBE added to PP/HDPE blend | 198 | 436 | 63.5<br>78 (Small) |
| 4. PBE + 0.2% HDPE + 6% PP blended in one step | One step | 252 | 550 | 62.7<br>78 (Small) |
| 5. (PBE + 6% PP) first blended then 0.2% HDPE blended | HDPE added to PP/PBE blend | 192 | 429 | 63.5<br>78 (Small) |
| 6. (PBE + 1% HDPE) first blended then 6% PP blended | PP added to PBE/HDPE blend | 60 | 154 | 71.5<br>79 (Small) |
| 7. (PP + 14.3% HDPE):PBE = 1:13.3 Final blend = PBE + 6% PP + 1% HDPE | PBE added to PP/HDPE blend | 66 | 170 | 70.5<br>79 (Small) |
| 8. PB + 1% HDPE + 6% PP blended in one step | One step | 78 | 176 | 70.3<br>79 (Small) |

EXAMPLE 2

Production rates of PBE/PP/HDPE blends containing 0.11, 0.22 and 0.33% HDPE were compared with PBE/PP and with a commerical film grade LDPE. The results are shown in Tables IIA and IIB.

The PBE/PP blend, containing 6% PP, was prepared on commercial scale equipment. The PBE/PP/HDPE blends were prepared from two masterbatches. The additives package for the runs of Table IIA was made into PP masterbatch with a Banbury type mixer and that for the runs of Table IIB in a twin screw extruder. The HDPE was added via a Banbury prepared masterbatch with PBE. The two masterbatches were dry blended with PBE at 11:1 letdown ratio and thereafter compounded on a 3½" Welex extruder.

All films were fabricated from a 3½" Egan extruder. The runs in Table IIA were made with a die having 0.022" gap, 4" diameter and 1½" land length; those in Table IIB with a die having a 0.024" gap, 6" diameter and 1" land length. The melt temperature for PBE/PP and PBE/PP/HDPE was about 210° C. The processing conditions employed during the fabrication of LDPE film were as recommended by resin suppliers.

The data in Table II demonstrate that on the particular equipment employed, the line speed and film production of PBE/PP/HDPE significantly exceeds that of PBE/PP and, with the apparent optimum amount of

TABLE IIB

| | PBE/PP | | | PBE/PP + 1.5% HDPE | | |
|---|---|---|---|---|---|---|
| Gauge, mil | 2 | 4 | 6 | 2 | 4 | 6 |
| Max. Line Speed, fpm | 28 | 23 | 18 | 36 | 26 | 21 |

EXAMPLE 3

Films prepared as in Example 2 were tested for significant properties. The results are listed in Table III. Here again, films according to this invention, with 0.22 and 0.33%w HDPE, respectively, were compared with PBE containing 6% PP, and with commercial LDPE. Data obtained with a commercial linear low density polyethylene (LLDPE) film are also shown. All films were 1.75 mil gauge.

The data in Table III show significantly better Elmendorf Tear properties for PBE/PP/HDPE compared to all other films. PBE/PP/HDPE film also has lower haze than all other films and gloss of the films containing 0.33% HDPE was equalled only by LLDPE. In its other shown properties, PBE/PP/HDPE did not differ significantly from PBE/PP. Both have significantly better tensile properties than LDPE or LLDPE, as well as greater heat seal strength, but have lower resistance to the Seal Dart Drop impact. The PBE/PP with 0.33% HDPE gave better Seal Dart Drop results than PBE/PP.

TABLE III

| | | PBE/LDPE | PBE/PP | PBE/PP + 0.22% w HDPE | PBE/PP + 0.33% w HDPE | LDPE | LLDPE |
|---|---|---|---|---|---|---|---|
| | | | | Comparative Properties | | | |
| Mechanical Properties | | | | | | | |
| Elmendorf Tear Strength | MD | 1106 | 1070 | 1300 | 1320 | 95 | 450 |
| (g/mil) | TD | 569 | 850 | 1150 | 980 | 80 | 660 |
| Tensile Break | MD | 6770 | 7100 | 7000 | 6700 | 3300 | 4400 |
| Strength (psi) | TD | 5030 | 5800 | 4800 | 5000 | 2800 | 5100 |
| % Elongation at Break | MD | 210 | 200 | 185 | 200 | 190 | 570 |
| | TD | 257 | 250 | 275 | 280 | 460 | 720 |
| Yield Strength (psi) | MD | 2010 | 2400 | 2400 | 2120 | 1450 | 1400 |
| | TD | 1770 | 2100 | 1800 | 1870 | 1350 | 1410 |
| Secant Modulus | MD | 24,900 | 34,400 | 30,200 | — | 20,700 | 22,700 |
| (psi) @ 2% Strain | TD | 28,800 | 32,900 | 30,500 | — | 24,700 | 25,600 |
| Film Dart Drop, f50[a] @ 26" height (g/1.75 mil) | | 383 | 348 | 367 | 357 | 266 | 262 |
| Seal Properties | | | | | | | |
| Break Strength (psi) | | 2800–3600 | 3000–4000 | 2800–4300 | 3800–4400 | 1500–2700 | 1800–2500 |
| Sealing Temp. | | 340–460 | 300–430 | 300–400 | 310–410 | 290–360 | 300–430 |
| Range, °F. (Δ °F.) | | (120) | (130) | (100) | (100) | (70) | (130) |
| Seal Dart Drop, f-50[a] @ 26" height Bottom seal, (g/1.75 ml) | | | 20–75 | — | 50–85 | 300–380 | 330–470 |
| Optical | | | | | | | |
| Haze, % | | 54.6 | 24.7 | 18.2 | 16.3 | 20.9 | 20.9 |
| Gloss @ 60°, % | | 24 | 39 | 46 | 68 | 53 | 69 |
| Film Gauge (mil) | | 1.75 | 1.75 | 1.75 | 1.75 | 1.75 | 1.75 |
| Blowup Ratio | | 2.7 | 2.7 | 2.7 | 2.7 | 2.1 | 2.1 |
| Melt Index, (dg/min) | | 1.0 | 1.0 | 1.0 | 1.0 | 0.25 | 1.0 |

[a]f-50 means 50% failure rate

What is claimed is:

1. A composition consisting essentially of an intimate blend of about 92 to 94% by weight of an isotactic butene-1-ethylene copolymer containing from about 0.5 to 10 mole percent ethylene, about 6 to 8% by weight of polypropylene, and about 0.02 to 1.5% by weight of high density polyethylene.

2. A composition consisting essentially of an intimate blend of about 94% by weight of an isotactic butene-1-ethylene copolymer, about 6% by weight of polypropylene, and about 0.05 to 0.25% by weight of high density polyethylene.

3. A heat sealable blown film or sheet prepared from an intimate blend consisting essentially of about 92 to 94% by weight of an isotactic butene-1-ethylene copolymer containing from about 0.5 to 10 mole percent ethylene, about 2 to 9% by weight of polypropylene, and about 0.02 to 1.5% by weight of high density polyethylene.

4. A heat sealable blown film or sheet prepared from an intimate blend consisting essentially of about 94% by weight of an isotactic butene-1-ethylene copolymer, about 6% by weight of polypropylene and about 0.05 to 0.25% by weight of high density polyethylene.

5. A composition according to claim 1, prepared by blending the polyethylene component with the major portion of the composition in the form of a masterbatch of said polyethylene in said copolymer or in isotactic butene-1 homopolymer.

6. A composition according to claim 2, prepared by blending the polyethylene component with the major portion of the composition in the form of a masterbatch of said polyethylene in said copolymer or in isotactic butene-1 homopolymer.

* * * * *